United States Patent
Wu et al.

(10) Patent No.: US 12,284,652 B2
(45) Date of Patent: Apr. 22, 2025

(54) METHOD AND APPARATUS FOR SCHEDULING REQUEST AND BUFFER STATUS REPORT TRANSMISSIONS

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN); Zhi Yan, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 443 days.

(21) Appl. No.: 17/628,127

(22) PCT Filed: Jul. 19, 2019

(86) PCT No.: PCT/CN2019/096878
§ 371 (c)(1),
(2) Date: Jan. 18, 2022

(87) PCT Pub. No.: WO2021/012115
PCT Pub. Date: Jan. 28, 2021

(65) Prior Publication Data
US 2022/0256576 A1    Aug. 11, 2022

(51) Int. Cl.
*H04W 72/21* (2023.01)
*H04W 72/542* (2023.01)
*H04W 72/566* (2023.01)

(52) U.S. Cl.
CPC ......... *H04W 72/21* (2023.01); *H04W 72/542* (2023.01); *H04W 72/569* (2023.01)

(58) Field of Classification Search
CPC . H04W 72/21; H04W 72/542; H04W 72/569; H04W 72/543; H04W 88/04; H04L 1/1874; H04L 1/188
See application file for complete search history.

(56) References Cited

U.S. PATENT DOCUMENTS

| 2017/0353819 | A1* | 12/2017 | Yin | H04W 4/70 |
| 2019/0334663 | A1* | 10/2019 | Dev | H04L 1/1874 |
| 2020/0037200 | A1* | 1/2020 | Cho | H04W 72/23 |

FOREIGN PATENT DOCUMENTS

| CN | 106455089 A | 2/2017 |
| CN | 106658743 A | 5/2017 |
| WO | 2015041408 A1 | 3/2015 |
| WO | 2018228549 A1 | 12/2018 |

OTHER PUBLICATIONS

R2-1905829, "Triggering condition of Pre-BSR", 3GPP TSG-RAN WG2 Meeting #106 (May 13-17, 2019). (Year: 2019).*

(Continued)

*Primary Examiner* — Charles C Jiang
*Assistant Examiner* — Shawn D Miller
(74) *Attorney, Agent, or Firm* — Kunzler Bean & Adamson

(57) ABSTRACT

The present disclosure relates to methods and apparatuses. According to some embodiments of the disclosure, a method includes: receiving a first buffer status report at a communication device; and triggering a pre-emptive buffer status report based on the first buffer status report if a trigger condition is met.

18 Claims, 5 Drawing Sheets

(56) References Cited

OTHER PUBLICATIONS

R2-1905829 (Year: 2019).*
LG Electronics, Enhancement for low latency uplink scheduling, 3GPP TSG-RAN WG2 #105, R2-1902167, Feb. 25-Mar. 1, 2019, pp. 1-4, Athens, Greece.
3GPP, 3rd Generation Partnership Project; Technical Specification Group Radio Access Network; NR; Medium Access Control (MAC) protocol specification (Release 15), 3GPP TS 38.321 V15.0.0, (Dec. 2017), pp. 1-55.
Lenovo, Motorola Mobility, UL scheduling latency in IAB system, 3GPP TSG-RAN WG2 Meeting #106, R2-1906915, May 13-May 17, 2019, pp. 1-3, Reno, USA.
International Searching Authority, "Written Opinion of the International Searching Authority," PCT/CN2019/096878, Apr. 10, 2020, pp. 1-3.
ZTE Corporation, Sanechips, Discussions on low latency scheduling in IAB, 3GPP TSG RAN WG2 Meeting #106, R2-1906571, May 13-17, 2019, pp. 1-4, Reno, NV, USA.
Vivo, Triggering conditions of Pre-BSR, 3GPP TSG RAN WG2 Meeting #106, R2-1905829, May 13-17, 2019, pp. 1-3, Reno, USA.

* cited by examiner

METHOD AND APPARATUS FOR SCHEDULING REQUEST AND BUFFER STATUS REPORT TRANSMISSIONS

TECHNICAL FIELD

The present disclosure generally relates to wireless communication technology, and more particularly to scheduling request or buffer status report transmissions in a wireless communication system.

BACKGROUND

In wireless communication systems, a buffer status reporting procedure is used to provide information about the size of data in uplink (UL) buffers of a User Equipment (UE) to a Base Station (BS) serving the UE. A Buffer Status Report (BSR) may be triggered when UL data arrives at a UE transmission buffer. A Scheduling Request (SR) is used to request UL resources. The SR may be triggered if the UE does not have a UL resource available for BSR transmission.

When a SR is triggered, it may be considered as pending until it is cancelled. A pending SR may be cancelled under certain circumstances including, for example, if new resources are available on an Uplink Shared Channel (UL-SCH), which may be granted by a BS through dynamically scheduling. A triggered BSR may be cancelled under certain circumstances including, for example, when a BSR is included in a MAC PDU for transmission.

There is a need for efficiently scheduling SR and BSR transmissions.

SUMMARY OF THE DISCLOSURE

An embodiment of the present disclosure provides a method. The method may include receiving a first Buffer Status Report (BSR) at a communication device; and triggering a Pre-emptive Buffer Status Report (Pre-BSR) based on the first BSR if a trigger condition is met. In an embodiment of the present application, the Pre-BSR includes a buffer status of the first BSR and one or more buffer statuses of one or more second BSRs pending at the communication device.

In an embodiment of the present application, the step of triggering the Pre-BSR may include triggering the Pre-BSR if a priority level of a Logical Channel (LCH) associated with the first BSR is higher than a priority threshold. In another embodiment of the present application, the step of triggering the Pre-BSR may include triggering the Pre-BSR if a latency value of a LCH associated with the first BSR is lower than a latency threshold. In yet another embodiment of the present application, the method may include starting a timer in response to triggering the Pre-BSR. The method may include prohibiting another Pre-BSR until the timer expires. The method may include triggering another Pre-BSR when the timer is running if a priority of a LCH included in a received third BSR is higher than the highest priority among priorities of LCHs included in the first BSR. The method may include triggering another Pre-BSR when the timer is running if a latency value of a LCH included in a received third BSR is lower than the lowest latency value among latency values of LCHs included in the first BSR.

In another embodiment of the present application, the method may include transmitting the Pre-BSR and starting a retransmission timer in response to the transmission of the Pre-BSR. The method may include retransmitting the Pre-BSR in response to an expiry of the retransmission timer if uplink data is expected to be received at the communication device.

In yet another embodiment of the present application, the method may include triggering a Pre-emptive Scheduling Request (Pre-SR) if there is no uplink resource available for transmitting the Pre-BSR.

In an embodiments of the present application, the method may include maintaining the triggered Pre-SR if uplink resource large enough to accommodate all pending data for transmission at the communication device but not enough to accommodate the Pre-BSR is granted. The uplink resource may be not large enough to accommodate the buffer statuses up to the last event that triggered a Pre-BSR. In another embodiment of the present application, the method may include cancelling the triggered Pre-SR if uplink resource large enough to accommodate the Pre-BSR is granted. The uplink resource may be large enough to accommodate the buffer statuses up to the last event that triggered a Pre-BSR.

In an embodiment of the present application, the Pre-SR may be associated with an egress LCH corresponding to an ingress LCH having the highest priority among at least one ingress LCH associated with the first BSR. In another embodiment of the present application, the Pre-SR may be associated with an egress LCH corresponding to an ingress LCH having the highest priority among at least one ingress LCH associated with the first BSR and one or more other BSRs received at the communication device. In yet another embodiment of the present application, the Pre-SR is associated with an egress LCH corresponding to an ingress LCH associated with a SR received at the communication device. In yet another embodiment of the present application, the Pre-SR is associated with an egress LCH having the highest priority among at least one egress LCH, and wherein the at least one egress LCH is associated with at least one Logical Channel Group (LCG) indicated in the Pre-BSR.

In an embodiment of the present application, the method may include, if the Pre-SR is to be transmitted at a transmission occasion the same as that for a first SR pending at the communication device, transmitting the first SR at the transmission occasion. The first SR may be associated with an egress LCH having data for transmission. In another embodiment of the present application, the method may include, if the Pre-SR is to be transmitted at a transmission occasion the same as that for a first SR pending at the communication device, transmitting one of the Pre-SR and the first SR which is associated with a LCH having the highest priority among the LCHs associated with the Pre-SR and the first SR. The first SR may be associated with an egress LCH having data for transmission.

In an embodiment of the present application, the method may include, if the Pre-SR is to be transmitted at a transmission occasion the same as that for a Physical Uplink Shared Channel (PUSCH) without Uplink Shared Channel (UL-SCH), transmitting the PUSCH at the transmission occasion.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
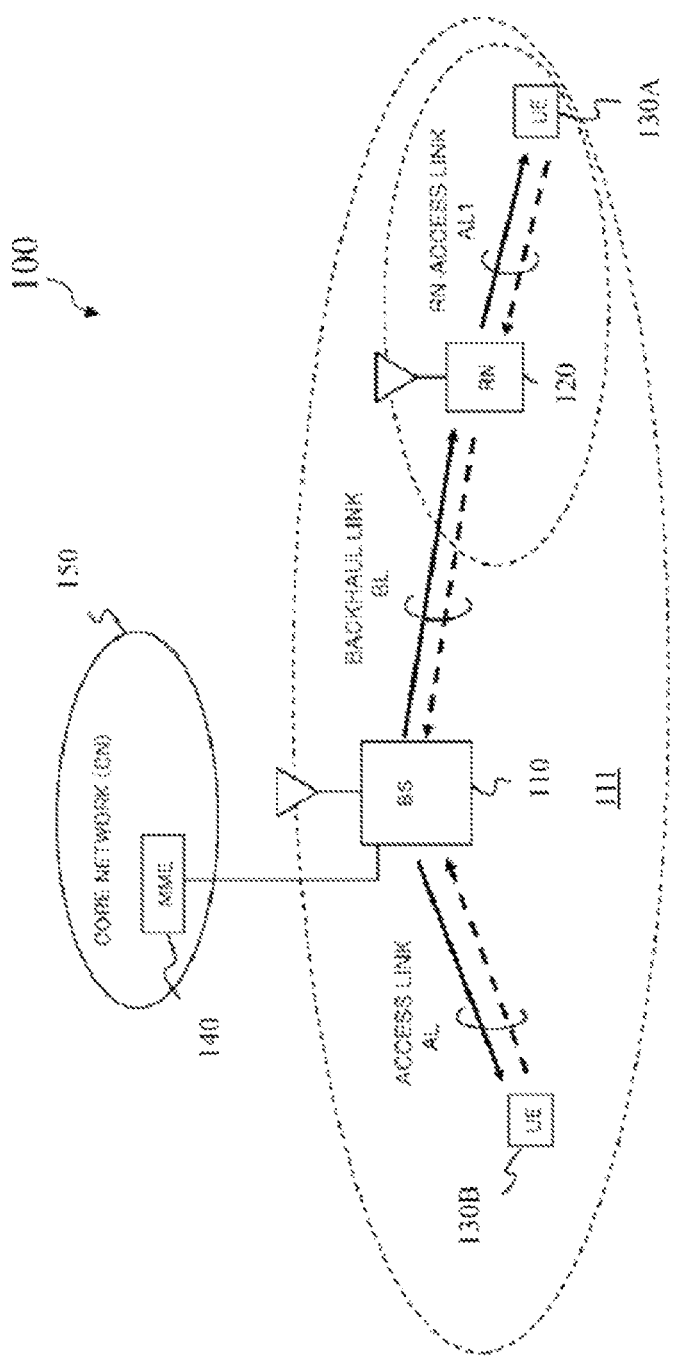
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some other embodiments of the present disclosure. Although, for simplicity, merely two UEs are illustrated in FIG. 1, it is also contemplated that wireless communication system 100 may include more or fewer UEs in some other embodiments of the present disclosure.

The BS 110, which communicates with a Core Network (CN) 150, may operate or work under the control of a Mobility Management Entity (MME) 140. The core network may include a Home Subscriber Server (HSS) (not illustrated in FIG. 1), which is communicatively coupled with the MME. The BS 110 may operate, for example based on a standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). The UE 130A may include, for example, but is not limited to, a computing device, a wearable device, a mobile device, an IoT device, etc. The UE 130B may include a device that is the same or similar to the UE 130A. The UE 130B may also include a device different from the UE 130A. Persons skilled in the art should understand that as technology develops and advances, the terminologies described in the present disclosure may change, but should not affect or limit the principles and spirit of the present disclosure.

The BS 110 (or a Donor BS) may establish radio connections with the UE 130B and the RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, the RN 120 may establish a radio connection with the UE 130A through an RN-access link (AL1) based on protocol Layer-1 to Layer-3. In some other embodiments of the present disclosure, the RN 120 may establish a radio connection with the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections with multiple UEs. Similarly, although FIG. 1 merely shows that the RN 120 is connected to a single UE for simplicity, it is contemplated that the RN 120 may also provide or establish connections with multiple UEs.

Deployment of RN(s) helps to enhance and/or extend coverage of a BS by a backhaul link. Evolved Universal Terrestrial Radio Access Network (E-UTRAN) supports relaying by having an RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

3GPP is envisioning an IAB architecture for 5G (NR) communication networks supporting multi-hop relays. In other words, an IAB node may hop through one or more IAB nodes before reaching the IAB Donor. A single hop may be considered a special instance of multiple hops. Multi-hop backhauling is relatively beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques. Multi-hop backhauling further enables backhauling around obstacles (e.g., buildings in urban environments for in-clutter deployments).

Figure 2:
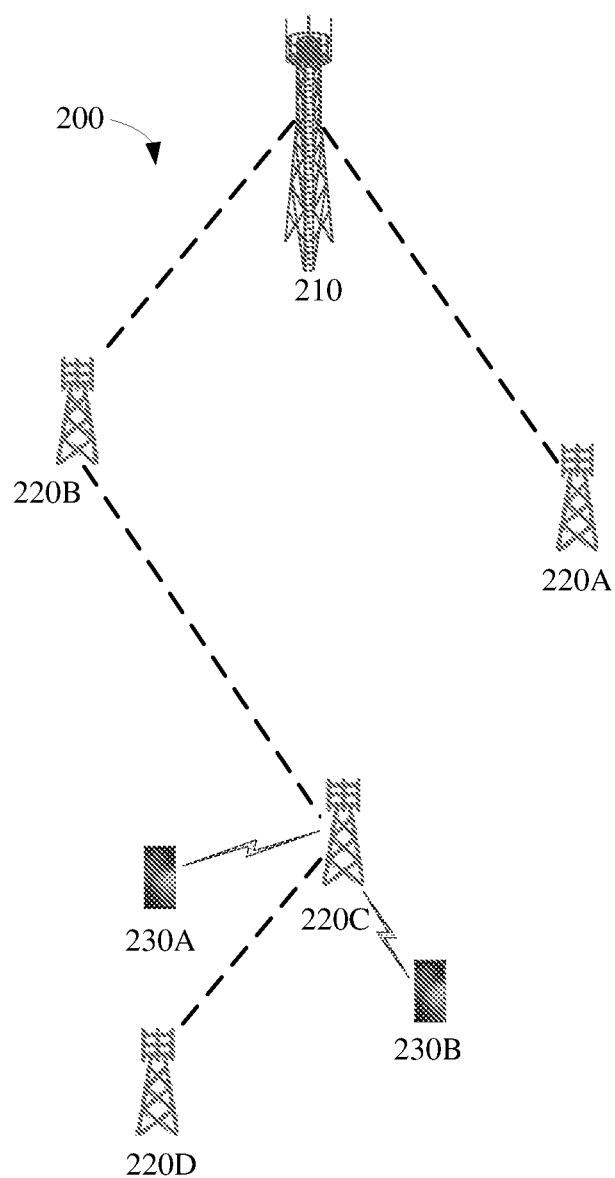
FIG. 2 illustrates a schematic wireless communication system according to some embodiments of the present disclosure.

FIG. 2 illustrates a wireless communication system 200 according to some embodiments of the present disclosure.

Referring to FIG. 2, the wireless communication system 200 can include a Donor node (e.g., IAB Donor 210), some IAB nodes (e.g., IAB node 220A, IAB node 220B, IAB node 220C, and IAB node 220D), and some UEs (e.g., UE 230A and UE 230B). Although merely one Donor node is illustrated in FIG. 2 for simplicity, it is contemplated that a wireless communication system 200 may include more Donor node(s) in some other embodiments of the present disclosure. Similarly, although merely four IAB nodes are illustrated in FIG. 2 for simplicity, it is contemplated that the wireless communication system 200 may include more or fewer IAB nodes in some other embodiments of the present disclosure. Although merely two UE are illustrated in FIG. 2 for simplicity, it is contemplated that the wireless communication system 200 may include more or fewer UEs in some other embodiments of the present disclosure.

IAB node 220A and IAB node 220B can be directly connected to IAB Donor 210. IAB Donor 210 is a parent node of IAB node 220A and IAB node 220B. IAB node 220C can reach IAB Donor 210 by hopping through IAB node 220B. IAB node 220B is a parent IAB node of IAB node 220C. In other words, IAB node 220C may be a child IAB node of IAB node 220B.

IAB node 220D can reach IAB Donor 210 by hopping through IAB node 220C and IAB node 220B. IAB node 220B and IAB node 220C may be upstream IAB nodes of IAB node 220D, and IAB node 220C may be a parent IAB node of IAB node 220D. IAB node 220C and IAB node 220D may be downstream IAB nodes of IAB node 220B.

UE 230A and UE 230B can be directly connected to IAB node 220C. In other words, UE 230A and UE 230B may be served by IAB node 220C. IAB node 220C, IAB node 220D, UE 230A, and UE 230B may be downstream nodes of IAB node 220B. IAB node 220D, UE 230A, and UE 230B may be child nodes of IAB node 220C.

Although IAB node 220A and IAB node 220B are connected to the same Donor node, i.e., IAB Donor 210, in FIG. 2, IAB node 220A and IAB node 220B may be connected to different Donor nodes in accordance with some other embodiments of the present disclosure.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node(s) in accordance with some other embodiments of the present disclosure.

Figure 3:
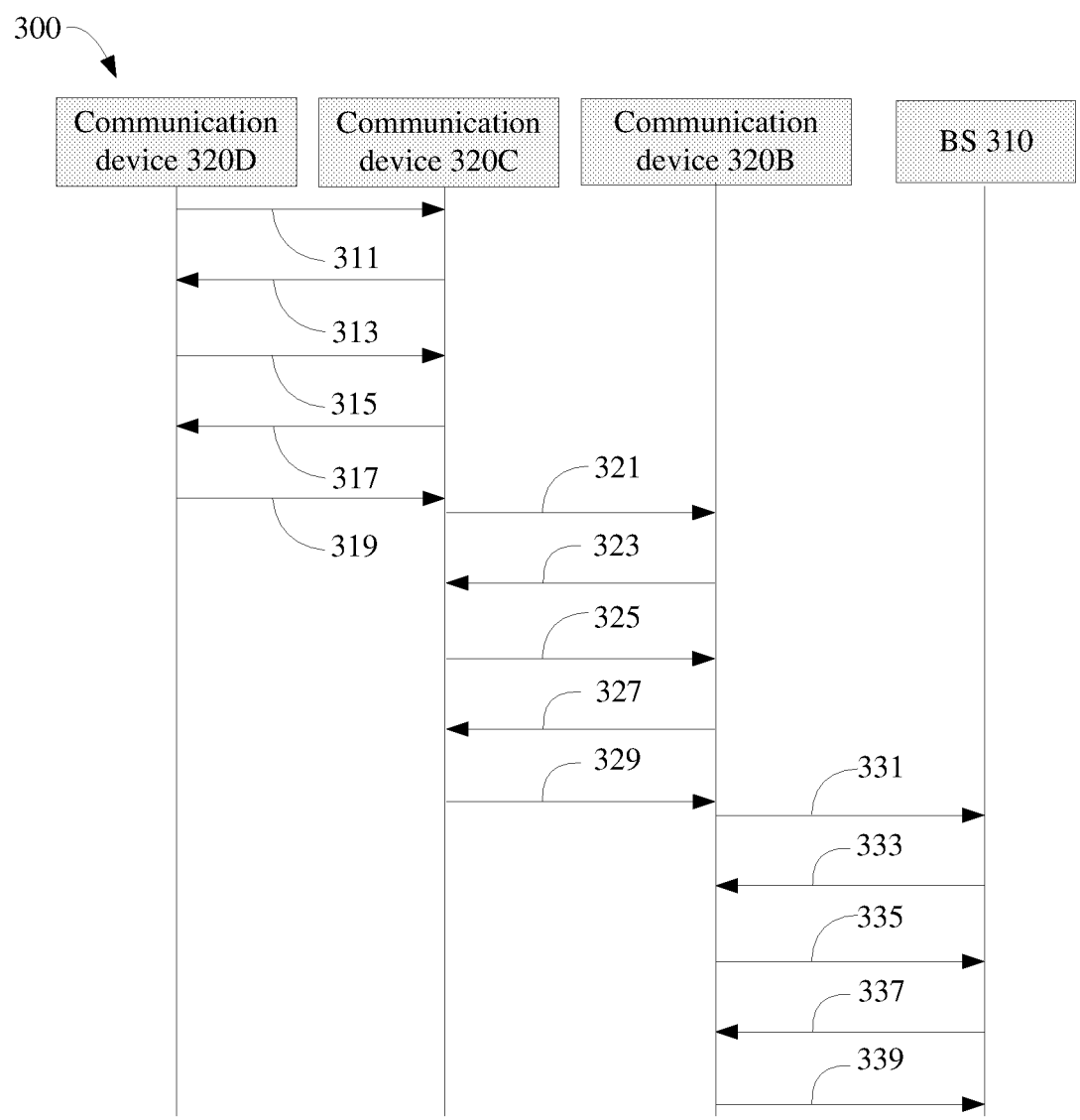
FIG. 3 illustrates a flow chart of an exemplary procedure of handling a UL transmission according to some embodiments of the present disclosure.

FIG. 3 illustrates a flow chart of an exemplary procedure 300 of handling a UL transmission according to some embodiments of the present disclosure.

In FIG. 3, communication device 320D can reach BS 310 by hopping through communication device 320C and communication device 320B. The communication device 320C can reach the BS 310 by hopping through the communication device 320B.

In some examples, the communication device 320B may function as the IAB node 220B shown in FIG. 2, the communication device 320C may function as the IAB node 220C shown in FIG. 2, the communication device 320D may function as the IAB node 220D, the UE 230A, or the UE 230B shown in FIG. 2, and the BS 310 may function as the IAB Donor 210 shown in FIG. 2.

Referring to FIG. 3, the communication device 320D may have UL data to be transmitted on at least one logical channel. The communication device 320D may, in operation 311, transmit a SR to its parent node (e.g., the communication device 320C) for requesting, for example, Uplink Shared Channel (UL-SCH) resources.

In some embodiments of the present disclosure, a SR may be associated with the at least one logical channel having data for transmission. Each logical channel may be allocated to a Logical Channel Group (LCG). The parameters for allocating the logical channels are defined in 3GPP specification TS 38.321. A LCG may include at least one logical channel, for example, four logical channels.

In operation 313, the communication device 320D may receive a UL grant from the communication device 320C for a UL transmission. In operation 315, the communication device 320D may transmit a Buffer Status Report (BSR) to the communication device 320C. The communication device 320C may allocate uplink resource for subsequent data transmission from communication device 320D.

In some embodiments of the present disclosure, a BSR may include buffer status for at least one LCG. The at least one LCG includes at least one logical channels. The logical channels included in the at least one LCG may be hereinafter referred to logical channels associated with the BSR or logical channels included in the BSR.

In some embodiments of the present disclosure, a BSR may be transmitted in a MAC Control Element (CE) of a MAC Protocol Data Unit (PDU). In the header of a MAC PDU, there may be a subheader indicating that the MAC CE includes a BSR. For example, in the header of a MAC PDU, there may be one corresponding field (e.g., Logical Channel ID (LCID) field) indicating the type of the BSR. The formats for MAC PDU are defined in 3GPP specification TS 38.321.

In operation 317, the communication device 320C may transmit to the communication device 320D a UL grant for subsequent data transmission from communication device 320D. In operation 319, the communication device 320D may transmit UL data to communication device 320C with the uplink resource allocated by communication device 320C.

After receiving a UL transmission from a child communication device (e.g. the communication device 320D), the communication device 320C may perform a similar UL scheduling as described above with respect to operations 311-319.

For example, in operation 321, the communication device 320C may transmit a SR to its parent node (e.g., the communication device 320B). In operation 323, the communication device 320C may receive a UL grant from the communication device 320B for the UL data transmission.

In operation 325, the communication device 320C may transmit a BSR to the communication device 320B. The communication device 320B may allocate uplink resource for subsequent data transmission from the communication device 320C.

In operation 327, the communication device 320B may transmit to the communication device 320C a UL grant for the subsequent data transmission from the communication device 320C. In operation 329, the communication device 320C may transmit UL data to the communication device 320B with the uplink resource allocated by the communication device 320B.

After receiving a UL data transmission from a child communication device (e.g., the communication device 320C), the communication device 320B may perform a similar UL scheduling as described above with respect to operations 311-319 and operations 321-329.

For example, in operation 331, the communication device 320B may transmit a SR to its parent node (e.g., the BS 310). In operation 333, the communication device 320B may receive a UL grant from the BS 310 for UL data transmission.

In operation 335, the communication device 320B may transmit a BSR to the BS 310. The BS 310 may allocate uplink resource for subsequent data transmission from the communication device 320B.

In operation 337, the BS 310 may transmit to the communication device 320B a UL grant for subsequent data transmission from the communication device 320B. In operation 339, the communication device 320B may transmit a UL data to the BS 310 with the uplink resource allocated by the BS 310.

In some embodiments of the present disclosure, when there are available UL resources (e.g., Physical Uplink Shared Channel (PUSCH) resources) for a communication device to send a BSR, a SR may be cancelled. In this scenario, operations 311, 313, 321, 323, 331 and 333 in FIG. 3 described above may be cancelled.

When there are no available UL resources for a communication device to send the BSR, the SR will be sent to the parent node of the communication device to require the parent node to allocate resources for the communication device, as described above with respect to operations 311, 313, 321, 323, 331 and 333 in FIG. 3.

In the exemplary procedure 300 shown in FIG. 3, a communication device may transmit a BSR or SR to its parent node after the communication device receives UL data from its child node. Namely, the received data is stored in a buffer of the communication device. Such BSR or SR may be hereinafter referred to as BSR, regular BSR, SR, or regular SR, if NOT specifically indicated.

Another solution for handling UL data transmission is to transmit a BSR or an SR to a parent node before a communication device receives the UL data from its child node, which may reduce latency resulted from UL scheduling. For example, in some embodiments of the present disclosure, the communication device may transmit a BSR or a SR to its parent node after it receives an SR or a BSR from its child node. In some embodiments of the present disclosure, the parent node may transmit a BSR or a SR to its parent node after it transmits a UL grant to its child node. Such BSR and SR that are transmitted before the reception of the UL data from the child node are hereinafter referred to as a Pre-emptive BSR (Pre-BSR) or a Pre-emptive SR (Pre-SR), respectively. The UL scheduling procedure employing the Pre-BSR or the Pre-SR will be described in detail in the following text with respect to FIG. 4.

Figure 4:
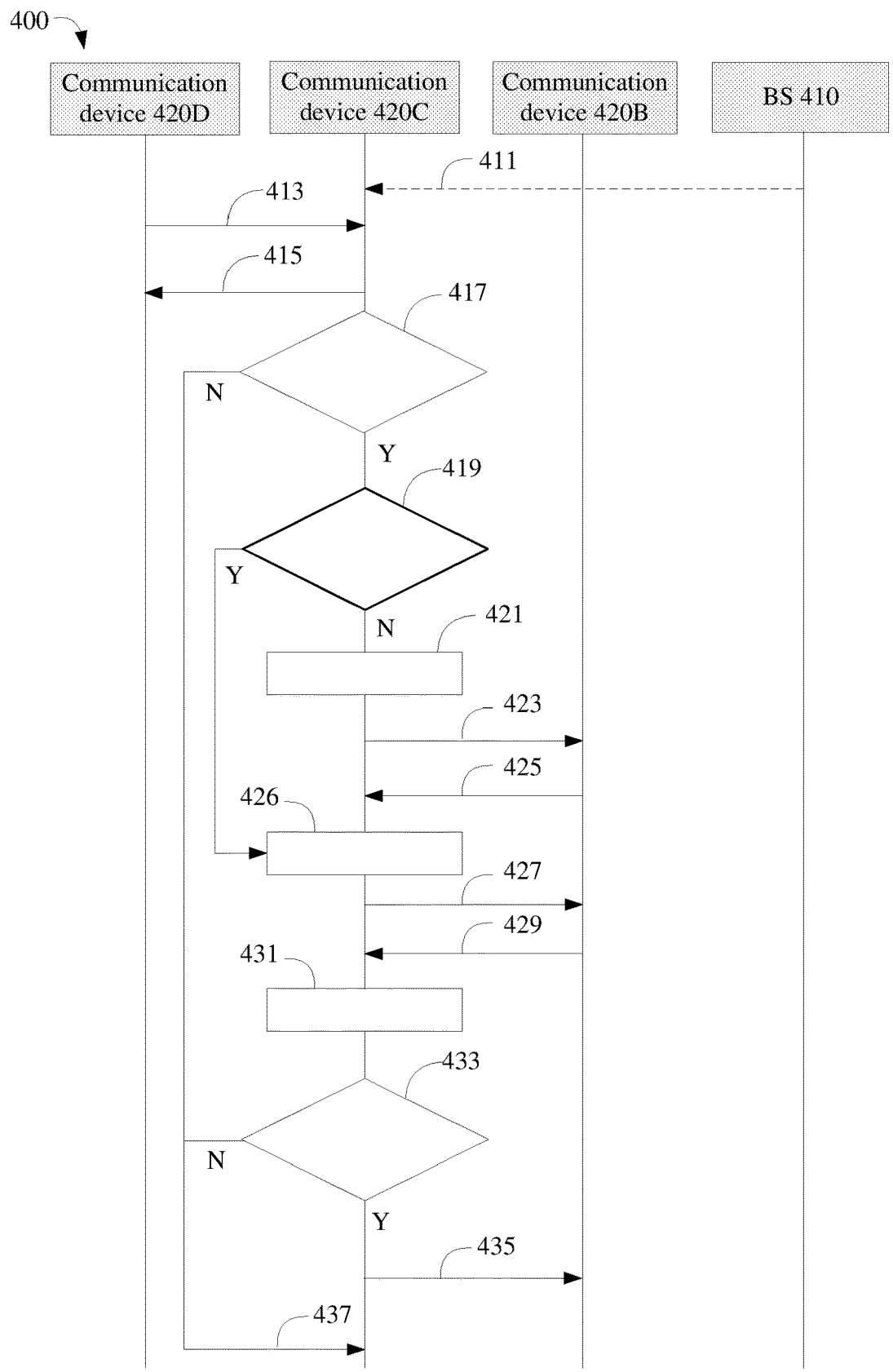
FIG. 4 illustrates a flow chart of an exemplary procedure of handling a UL transmission according to some embodiments of the present disclosure.

FIG. 4 illustrates a flow chart of an exemplary procedure 400 of handling a UL transmission according to some embodiments of the present disclosure.

In FIG. 4, communication device 420D can reach BS 410 by hopping through communication device 420C and communication device 420B. The communication device 420C can reach the BS 410 by hopping through the communication device 420B. The communication device 420C may be directed connected to the BS 410 in accordance with some other embodiments of the present disclosure.

In some examples, the communication device 420B may function as the IAB node 220B shown in FIG. 2, the communication device 420C may function as the IAB node 220C shown in FIG. 2, the communication device 420D may function as the IAB node 220D, the UE 240A, or the UE 240B shown in FIG. 2, and the BS 410 may function as the IAB Donor 210 shown in FIG. 2.

Referring to FIG. 4, in some embodiments of the present disclosure, the procedure 400 may include operation 411 (denoted by dotted arrow as an option). In operation, the BS 410 may transmit information for configuring a trigger condition to at least one communication device (e.g., the communication device 420C) served by the BS 410.

In operation 413, the communication device 420C may receive a BSR from a child node (e.g., the communication device 420D). In operation 415, the communication device 420C may transmit a UL grant to the communication device 420D. In some embodiments of the present disclosure, the communication device 420C may also receive a BSR from a child node (e.g., communication device 420E, not shown in FIG. 4) different from the communication device 420D. The communication device 420C may transmit a UL grant to the communication device 420E.

In some embodiments of the present disclosure, before the communication device 420D transmits a BSR to the communication device 420C, the communication device 420D may transmit a SR to the communication device 420C if there is no UL resource available for transmitting the BSR (not shown in FIG. 4). After receiving a UL grant from the communication device 420C for UL transmission (not shown in FIG. 4), the communication device 420D may then transmit the BSR to the communication device 420C.

In operation 417, the communication device 420C may determine whether a triggering condition for transmitting a Pre-BSR or a Pre-SR is met. If the communication device 420C determines that a triggering condition for transmitting a Pre-BSR or a Pre-SR is not met, the communication device 420C may not be triggered for Pre-BSR or Pre-SR transmission, and procedure 400 may go to operation 437, waiting for subsequent operation(s). If the communication device 420C determines that a triggering condition for transmitting a Pre-BSR or a Pre-SR is met, procedure 400 may go to operation 419.

In some embodiments of the present disclosure, the communication device 420C may determine whether a triggering condition is met by determining whether a priority level of a logical channel associated with a BSR from the communication device 420D is higher than a priority threshold. The communication device 420C may determine that a triggering condition is met if the priority level of a logical channel associated with the BSR from the communication device 420D is higher than a priority threshold.

For example, the range of values for the priority of a logical channel may be "0" to "7," wherein "0" may represent the highest priority level, and "7" may present the lowest priority level. The priority threshold may be set to "4." If the value of the priority of a logical channel associated with the BSR is equal to "3," the triggering condition is met since the priority level of the logical channel is higher than the priority threshold.

In some embodiments of the present disclosure, the communication device 420C may determine whether a triggering condition is met by determining whether a latency value of a logical channel associated with a BSR from the communication device 420D is lower than a latency threshold. The communication device 420C may determine that a triggering condition is met if the latency value of a logical channel associated with the BSR from the communication device 420D is lower than a latency threshold.

For example, the latency threshold may be set to 10 ms (millisecond). If the latency value of a logical channel associated with a BSR from the communication device 420D is 9 ms, the triggering condition is met since the latency value of the logical channel is lower than the latency threshold.

In some embodiments of the present disclosure, the communication device 420C may determine whether a triggering condition is met by determining whether when a timer (T1) for prohibiting Pre-BSR is running. A communication device may start such timer every time after it triggers a Pre-BSR, and may prohibit another Pre-BSR until the timer T1 expires. For example, before receiving a BSR from the communication device 420D, the communication device 420C may trigger a Pre-BSR based on a BSR from a child node (e.g., communication device 420E, which is not shown in FIG. 4) of the communication device 420C, and may start the timer T1 in response to triggering the above-mentioned Pre-BSR based on a BSR from the communication device 420E.

In some embodiments of the present disclosure, if the communication device 420C determines that the timer T1 is running, the communication device 420C may determine that the triggering condition is not met. That is, the communication device 420C may prohibit any Pre-BSR. Otherwise, if the communication device 420C determines that the timer T1 expires, the communication device 420C may determine that the triggering condition is met. The communication device 420C may trigger a Pre-BSR accordingly.

In some embodiments of the present disclosure, although the timer for prohibiting Pre-BSR (T1) is running, the communication device 420C may still determine a triggering condition is met if one or more other criteria are met. For example, the one or more other criteria may be related to a priority threshold, a latency threshold, or both.

In some embodiments of the present disclosure, the communication device 420C may determine a triggering condition is met when the timer T1 is running if a priority level of a logical channel included in the BSR from the communication device 420D is higher than the highest priority among the priorities of logical channels included in the above-mentioned BSR from the communication device 420E.

In some embodiments of the present disclosure, the communication device 420C may determine a triggering condition is met when the timer T1 is running if a latency value of a logical channel included in the BSR from the communication device 420D is lower than the lowest latency value among latency values of logical channels included in the above-mentioned BSR from the communication device 420E.

Other criteria for determining whether a triggering condition is met or not may also be employed. These criteria may be employed alone or in any combination thereof.

In some embodiments of the present disclosure, the triggering condition may be configured by the BS 410 via an RRC signaling or F1 signaling, or the like, as described above with respect to operation 411. F1 interface is a point-to-point interface between endpoints. In some embodiments, the F1 interface may support exchange of signaling information (i.e., F1 signaling(s)) between the endpoints, and may support data transmission to respective endpoints. For example, F1 interface between the BS 410 and the communication device 420C may support exchange of signaling information and data transmission between the BS 410 and the communication device 420C. In some embodiments of the present disclosure, the RRC signaling or F1 signaling from the BS 410 may include configuration information indicating one or more of the following parameters: a priority threshold, a latency threshold, or a value of a timer. The definitions of these parameters are described above with respect to operation 417, and thus are omitted herein. Other parameters may also be indicated in the configuration information. In some other embodiments, the triggering condition may be preconfigured.

Employing a triggering condition for transmitting a Pre-BSR or a Pre-SR may be helpful since it may allow the Pre-BSR or Pre-SR to be transmitted in a more efficient manner.

In some embodiments of the present disclosure, the triggering condition may not be applied to communication device 420C. In other words, operation 417 described above may be eliminated, and the communication device 420C may trigger a Pre-BSR or a Pre-SR in any case.

In operation 419, the communication device 420C may determine whether there is UL resource available for Pre-BSR transmission. If the UL resource is available for the Pre-BSR transmission, procedure 400 may go to operation 426. Otherwise, if there is no UL resource available for transmitting a Pre-BSR, procedure 400 may go to operation 421 for triggering a Pre-SR.

At a communication device, logical channels from a child communication device (ingress logical channels) of the communication device may be mapped to corresponding logical channels to a parent node (egress logical channels) of the communication device.

For example, the communication device 420C may receive data from logical channels LCH #D-1 and LCH #D-2 from the communication device 420D, and may receive data from logical channels LCH #E-1, LCH #E-2, and LCH #E-3 from a different child node (e.g., communication device 420E, which is not shown in FIG. 4). Logical channels LCH #D-1 and LCH #D-2 may be associated with logical channel group LCG #D-1, logical channels LCH #E-1 and LCH #E-2 may be associated with logical channel group LCG #E-1, and logical channel LCH #E-3 may be associated with logical channel group LCG #E-2. The communication device 420C may transmit data to a parent node (e.g., the communication device 420B) via logical channels LCH #C-1, LCH #C-2, and LCH #C-3, which may be associated with logical channel groups LCG #C-1, LCG #C-2, and LCG #C-3, respectively. Logical channels LCH #C-1, LCH #C-2, and LCH #C-3 may also be referred to as BackHaul (BH) logical channels. Ingress logical channels LCH #D-1 and LCH #E-1 may be mapped to egress logical channel LCH #C-1, ingress logical channels LCH #D-2 and LCH #E-2 may be mapped to egress logical channel LCH #C-2, and ingress logical channel LCH #E-3 may be mapped to egress logical channel LCH #C-3. The mapping of the ingress logical channels and egress logical channels is as follows.

TABLE 1

| Ingress logical channel | Egress logical channel |
|---|---|
| LCH#D-1 | LCH#C-1 |
| LCH#E-1 | |
| LCH#D-2 | LCH#C-2 |
| LCH#E-2 | |
| LCH#E-3 | LCH#C-3 |

As mentioned above, a BSR may be associated with at least one logical channel group, each logical channel group including at least one logical channel. Similar to a regular SR, a Pre-SR may be associated with at least one logical channel. After receiving a BSR from a child node (e.g., communication device 420D), the communication device 420C may determine a Pre-SR associated with an egress logical channel for requesting UL resource for Pre-BSR transmission.

In operation 421, the communication device 420C may determine a Pre-SR, and may trigger the Pre-SR. The Pre-SR may be determined based on received BSR or SR, the Pre-BSR which triggers the Pre-SR, or other suitable criteria.

In some embodiments of the present disclosure, the communication device 420C may trigger a Pre-SR associated with an egress logical channel corresponding to an ingress logical channel having the highest priority among at least one ingress logical channels associated with the BSR received from a child node.

For example, the communication device 420C may receive a BSR from the communication device 420D indicating buffer status of logical channel group LCG #D-1, which includes logical channels LCH #D-1 and LCH #D-2. Assuming that the priority level of logical channel LCH #D-1 is higher than that of logical channels LCH #D-2, the communication device 420C may trigger a Pre-SR associated with egress logical channel LCH #C-1, which corresponds to ingress logical channel LCH #D-1 as shown in Table 1.

In some embodiments of the present disclosure, the communication device 420C may trigger a Pre-SR associated with an egress logical channel corresponding to an ingress logical channel having the highest priority among at least one ingress logical channels associated with the BSR from the child node and one or more other BSRs received at the communication device.

For example, the communication device 420C may receive a BSR from the communication device 420E (not shown in FIG. 4) indicating buffer status of logical channel group LCG #E-1, which includes logical channels LCH #E-1 and LCH #E-2. The communication device 420C may also receive a BSR from the communication device 420D indicating buffer status of logical channel group LCG #D-1, which includes logical channels LCH #D-1 and LCH #D-2. The communication device 420C may determine to trigger a Pre-SR in response to the BSR from the communication device 420D. Assuming that the priority level of logical channel LCH #D-1 is the highest among those of logical channels LCH #D-2, LCH #E-1 and LCH #E-2, the communication device 420C may trigger a Pre-SR associated with egress logical channel LCH #C-1, which corresponds to ingress logical channel LCH #D-1 as shown in Table 1.

In some embodiments of the present disclosure, the communication device 420C may trigger a Pre-SR associated with an egress logical channel corresponding to an ingress logical channel associated with a SR received at the communication device.

For example, the communication device 420C may receive a SR from the communication device 420D to request a UL grant for BSR transmission (not shown in FIG. 4). The SR may be associated with at least one of logical channels LCH #D-1 and LCH #D-2. After receiving the UL grant, the communication device 420D may then transmit a BSR to the communication device 420C. The communication device 420C may determine to trigger a Pre-SR in response to the BSR from the communication device 420D. Assuming that the SR from the communication device 420D is associated with logical channel LCH #D-1, the communication device 420C may trigger a Pre-SR associated with egress logical channel LCH #C-1, which corresponds to ingress logical channel LCH #D-1 as shown in Table 1.

In some embodiments of the present disclosure, a SR received from a child node may be associated with two or more ingress logical channels, which may correspond to two or more different egress logical channels. The communication device 420C may determine to trigger a Pre-SR associated with one of these egress logical channels. In some examples, the communication device 420C may trigger a Pre-SR associated with an egress logical channel having the highest priority among these egress logical channels. In some examples, the communication device 420C may trigger a Pre-SR associated with an egress logical channel corresponding to an ingress logical channel having the highest priority among the two or more ingress logical channels. In some examples, the communication device 420C may randomly trigger a Pre-SR associated with one of the egress logical channels.

In some embodiments of the present disclosure, the communication device 420C may trigger a Pre-SR associated with an egress logical channel having the highest priority among at least one egress logical channel associated with at least one logical channel group indicated in the Pre-BSR.

For example, the communication device 420C may determine to trigger a Pre-SR to request UL resource for Pre-BSR transmission. Similar to a regular BSR, a Pre-BSR may be associated with at least one logical channel group, each logical channel group including at least one logical channel. For example, the Pre-BSR may indicate the buffer statuses of LCG #C-1, LCG #C-2, and LCG #C-3, which include egress logical channels LCH #C-1, LCH #C-2, and LCH #C-3, respectively. Assuming that the priority level of egress logical channel LCH #C-1 is the highest among those of egress logical channels LCH #C-1, LCH #C-2, and LCH #C-3, the communication device 420C may trigger a Pre-SR associated with egress logical channel LCH #C-1.

In some embodiments of the present disclosure, a triggered Pre-SR may be cancelled. For example, after a Pre-SR is triggered, the communication device 420C may receive a UL grant from its parent node. The UL grant may indicate UL resources with a certain size and time for UL transmission (transmission occasion). The communication device 420C may determine whether the UL resources are large enough to accommodate all pending data for transmission at the communication device 420C and the Pre-BSR. If the UL resources are not large enough to accommodate the Pre-BSR, the triggered Pre-SR may be maintained. For example, the triggered Pre-SR may be maintained if the UL resources are large enough to accommodate all pending data for transmission but not enough to further accommodate the Pre-BSR, or if the UL resources are not large enough to accommodate all pending data for transmission. Otherwise, if the UL resources are large enough to accommodate the Pre-BSR, the triggered Pre-SR may be cancelled. If the UL resources are large enough to accommodate all pending data for transmission but not enough to accommodate the Pre-BSR, pending SR may be cancelled.

In some embodiments of the present disclosure, the communication device 420C may determine whether the UL resource is large enough to accommodate the buffer statuses up to the last event that triggered a Pre-BSR. If the UL resources are not large enough to accommodate the buffer statuses up to the last event that triggered a Pre-BSR, the triggered Pre-SR may be maintained. Otherwise, if the UL resources are large enough to accommodate the buffer statuses up to the last event that triggered a Pre-BSR, the triggered Pre-SR may be cancelled.

For example, the communication device 420C may determine whether the UL resource is large enough to accommodate the buffer statuses of all triggered Pre-BSR pending at the communication device. If the UL resource is not large enough to accommodate the buffer statuses of all triggered Pre-BSR pending at the communication device, the triggered Pre-SR may be maintained. Otherwise, if the UL resource is large enough to accommodate the buffer statuses of all triggered Pre-BSR pending at the communication device, the triggered Pre-SR may be maintained.

In operation 423, the communication device 420C may transmit a Pre-SR to a parent node (e.g., the communication device 420B) of the communication device 420C at a transmission occasion. In operation 425, the communication device 420B may transmit a UL grant in response.

In some embodiments of the present disclosure, the communication device 420C may determine that a regular SR is pending at the communication device. A regular SR may be associated with at least one egress logical channel having data for transmission. The communication device 420C may determine that a Pre-SR and a regular SR may be transmitted at the same transmission occasion (e.g., TO0). In other words, the transmission of a Pre-SR may collide with that of a regular SR. In this scenario, the communication device 420C has to select one of the Pre-SR and the regular SR to transmit at a given time (e.g., one at a transmission occasion TO0, and the other at a transmission occasion subsequent to the transmission occasion TO0).

In some embodiments of the present disclosure, the regular SR may be given priority for transmission. For example, the communication device 420C transmits the regular SR at a transmission occasion TO0, and transmits the Pre-SR at a transmission occasion subsequent to the transmission occasion TO0.

In some embodiments of the present disclosure, one of the Pre-SR and the regular SR which is associated with a logical channel having the highest priority among the logical channels associated with the Pre-SR and the regular SR may be given priority for transmission. For example, if the communication device 420C determines that the Pre-SR is associated with a logical channel having a priority higher than the highest priority among the logical channels associated with the regular SR, the Pre-SR may be given priority for transmission. For example, the communication device 420C transmits the Pre-SR at a transmission occasion TO0, and transmits the regular SR at a transmission occasion subsequent to the transmission occasion TO0. Otherwise, the communication device 420C transmits the regular SR at a transmission occasion TO0, and transmits the Pre-SR at a transmission occasion subsequent to the transmission occasion TO0.

In some embodiments of the present disclosure, the communication device 420C may select one of the Pre-SR and the regular SR according to other suitable criteria.

In some embodiments of the present disclosure, the communication device 420C may determine that a PUSCH without UL-SCH is to be transmitted. For example, the communication device 420C may determine that Channel State Information (CSI) without data is to be reported.

In some embodiments of the present disclosure, the communication device 420C may determine that the PUSCH without UL-SCH is to be transmitted at the same transmission occasion (TO0) as that for the Pre-SR. In other words, the transmission of a Pre-SR may collide with that of a PUSCH without UL-SCH. In some embodiments, the PUSCH without UL-SCH may be given priority for transmission. For example, the communication device 420C may transmit the PUSCH at a transmission occasion TO0, and may transmit the Pre-SR at a transmission occasion subsequent to the transmission occasion TO0. In some embodiments, the Pre-SR may be given priority for transmission.

In some embodiments of the present disclosure, a regular SR may be transmitted at a transmission occasion (TO0) the same as that of a PUSCH without UL-SCH. In other words, the transmission of a regular SR may collide with that of a PUSCH without UL-SCH. In some embodiments, the regular SR may be given priority for transmission. For example, the communication device 420C may transmit the regular SR at a transmission occasion TO0, and may transmit the PUSCH at a transmission occasion subsequent to the transmission occasion TO0. In some embodiments, the PUSCH without UL-SCH may be given priority for transmission.

In operation 426, the communication device 420C may trigger a Pre-BSR based on the BSR received from the communication device 420D. The Pre-BSR may include buffer statuses of the BSR received from the communication device 420D. In some embodiments of the present disclosure, the Pre-BSR may also include one or more buffer statuses of one or more other BSRs pending at the communication device. For example, the communication device 420B may receive a BSR from a different child node (e.g., communication device 420E, which is not shown in FIG. 4). The Pre-BSR may include the buffer statuses of the BSR received from the communication device 420D and the buffer statuses of the BSR received from the communication device 420E.

In some embodiments of the present disclosure, the communication device 420C may start a timer (T1) for prohibiting another Pre-BSR in response to triggering the Pre-BSR in operation 426. The mechanism of the timer T1 is described above with respect to operation 417, and thus is omitted herein.

Similar to a regular BSR, a Pre-BSR may also be transmitted in a MAC CE of a MAC PDU. In the header of a MAC PDU, there may be a subheader indicating that the MAC CE includes a Pre-BSR. In some embodiments of the present disclosure, a triggered Pre-BSR or a regular BSR may be cancelled.

In some embodiments of the present disclosure, a Pre-BSR and a regular BSR may be transmitted in separate MAC CEs. In some examples, all triggered regular BSRs may be cancelled if the UL resource is large enough to accommodate all pending data available for transmission, but is not large enough to additionally accommodate the MAC CE for the regular BSRs plus the subheader for the MAC CE. In some examples, all Pre-BSRs triggered prior to MAC PDU assembly may be cancelled if a MAC PDU is transmitted and this MAC PDU includes an early BSR MAC CE for a Pre-BSR which contains buffer statuses up to (and including) the last event that triggered a Pre-BSR prior to the MAC PDU assembly.

In some embodiments of the present disclosure, a Pre-BSR and a regular BSR may be combined to be transmitted in a MAC CE for BSR (combined BSR MAC CE). In other words, a combined BSR or a combined BSR MAC CE may include buffer status corresponding to pending data available for transmission and buffer status corresponding to data to be received (pre-emptive buffer status). In some examples, if no BSR is triggered by pre-emptive buffer status, all triggered BSRs may be cancelled if the UL resource is large enough to accommodate all pending data available for transmission, but is not large enough to additionally accommodate the MAC CE for the BSRs plus the subheader for the MAC CE. In some examples, all BSRs (including Pre-BSRs and regular BSRs) triggered prior to MAC PDU assembly may be cancelled if a MAC PDU is transmitted and this MAC PDU includes a combined BSR MAC CE which contains buffer status up to (and including) the last event that triggered a BSR (Pre-BSR or regular BSR) prior to the MAC PDU assembly.

In operation 427, the communication device 420C may transmit a Pre-BSR to the communication device 420B at a transmission occasion, which may, in operation 429, transmit a UL grant in response.

In operation 431, in response to the transmission of the Pre-BSR, the communication device 420C may start a retransmission timer. In operation 433, the communication device 420C may determine whether to retransmit a Pre-BSR to the communication device 420B in response to an expiry of the retransmission timer. If the communication device 420C determines that there is no need to retransmit the Pre-BSR, procedure 400 may go to operation 437, waiting for subsequent operation(s). Otherwise, the communication device 420C may retransmit the Pre-BSR to the communication device 420B in operation 435.

In some embodiments of the present disclosure, the communication device 420C may determine, when a retransmission timer expires, whether to retransmit a Pre-BSR by determining whether UL data is expected to be received at the communication device 420C. If it is determined that UL data is expected to be received at the communication device 420C, the communication device 420C may retransmit the Pre-BSR to the communication device 420B.

For example, the communication device 420C may be aware of the amount of data originally expected from its child node(s) (e.g., the communication device 420D) based on BSR(s) received from the child node(s). At the time when the retransmission timer expires, the communication device 420C may receive all or part of data originally expected from the child node(s), and may transmit all or part of the received data to the corresponding parent node(s) (e.g., communication device 420B).

The communication device 420C may determine whether UL data is to be received at the communication device 420C by, for example, comparing the amount of data originally expected with the amount of the received data. If it is determined that the amount of data originally expected is greater than the amount of the received data, that is, UL data is to be received at the communication device 420C, the communication device 420C may, in operation 435, retransmit a Pre-BSR to corresponding parent node(s) (e.g., communication device 420B).

In some embodiments of the present disclosure, the transmitted Pre-BSR may indicate the amount of UL data to be received at the communication device 420C. For example, the transmitted Pre-BSR may indicate the difference between the amount of data originally expected and the amount of the received data.

Although the exemplary procedure 400 shows that operation 417 occurs after operation 415, i.e., in response to transmitting a UL grant to a child node, it should be appreciated by persons skilled in the art that operation 417 may occurs at various phases of the UL transmission, without departing from the spirit and scope of the disclosure. For example, operation 417 may occur after operation 413, i.e., in response to receiving a BSR from a child node.

Although the exemplary procedure 400 shows operations 411-437, it should be appreciated by persons skilled in the art that some of the operations 411-437 may be eliminated, without departing from the spirit and scope of the disclosure.

Figure 5:
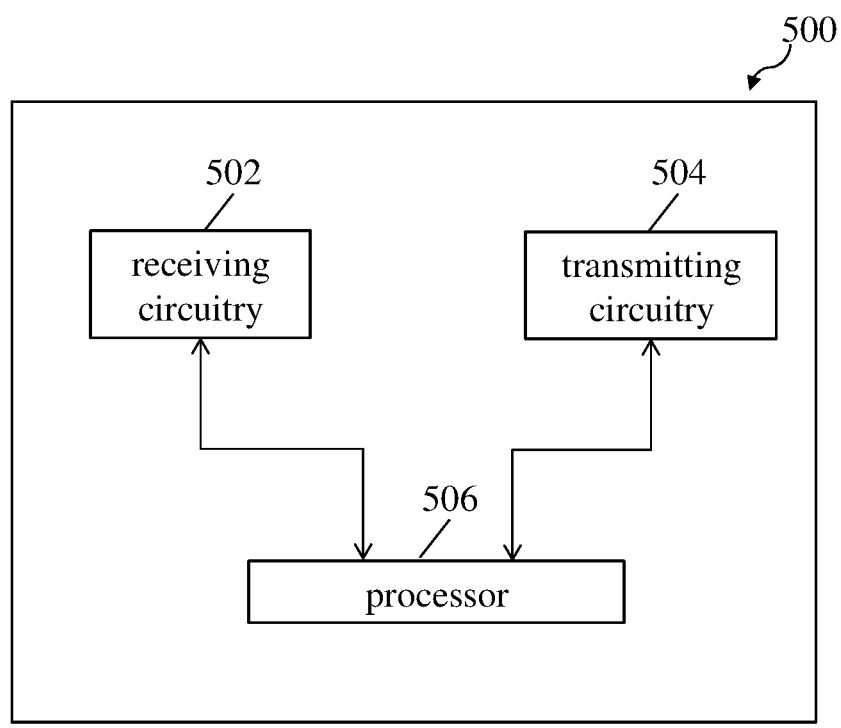
FIG. 5 illustrates an example block diagram of an apparatus according to some embodiments of the present disclosure.

FIG. 5 illustrates an example block diagram of an apparatus 500 according to some embodiments of the present disclosure.

As shown in FIG. 5, the apparatus 500 may include at least one non-transitory computer-readable medium (not illustrated in FIG. 5), a receiving circuitry 502, a transmitting circuitry 504, and a processor 506 coupled to the non-transitory computer-readable medium (not illustrated in FIG. 5), the receiving circuitry 502 and the transmitting circuitry 504. The apparatus 500 may be a BS or a communication device (e.g., an IAB node or a UE).

Although in this figure, elements such as processor 506, transmitting circuitry 504, and receiving circuitry 502 are described in the singular, the plural is contemplated unless limitation to the singular is explicitly stated. In some embodiments of the present disclosure, the receiving circuitry 502 and the transmitting circuitry 504 are combined into a single device, such as a transceiver. In certain embodiments of the present disclosure, the apparatus 500 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 506 interacting with receiving circuitry 502 and transmitting circuitry 504, so as to perform the steps with respect to the IAB nodes and UEs depicted in FIG. 2 and the communication devices depicted in FIGS. 3 and 4.

In some embodiments of the present disclosure, the non-transitory computer-readable medium may have stored thereon computer-executable instructions to cause a processor to implement the method with respect to the BS as described above. For example, the computer-executable instructions, when executed, cause the processor 506 interacting with receiving circuitry 502 and transmitting circuitry 504, so as to perform the steps with respect to the IAB donors depicted in FIG. 2 and the BS s depicted in FIGS. 3 and 4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method at a communication device, the method comprising:
receiving a first buffer status report (BSR);

triggering a preemptive buffer status report (Pre-BSR) based on the first BSR in response to a trigger condition being met;

determining that no uplink resource is available for transmitting the pre-BSR; and based on the determining, triggering a preemptive scheduling request (Pre-SR) in response to there being no uplink resource available for transmitting the Pre-BSR.

2. The method of claim 1, wherein the Pre-BSR includes a buffer status of the first BSR and one or more buffer statuses of one or more second BSRs pending at the communication device.

3. The method of claim 1, wherein:
triggering the Pre-BSR comprises triggering the Pre-BSR if a priority level of a logical channel (LCH) associated with the first BSR is higher than a priority threshold.

4. The method of claim 1, wherein:
triggering the Pre-BSR comprises triggering the Pre-BSR if a latency value of a logical channel (LCH) associated with the first BSR is lower than a latency threshold.

5. The method of claim 1, further comprising:
starting a timer in response to triggering the Pre-BSR.

6. The method of claim 5, further comprising:
prohibiting another Pre-BSR until the timer expires.

7. The method of claim 5, further comprising:
if the timer is running, if a priority of a logical channel (LCH) included in a received third BSR is higher than the highest priority among priorities of LCHs included in the first BSR, triggering another Pre-BSR.

8. The method of claim 5, further comprising:
if the timer is running, if a latency value of a logical channel (LCH) included in a received third BSR is lower than the lowest latency value among latency values of LCHs included in the first BSR, triggering another Pre-BSR.

9. The method of claim 1, further comprising:
transmitting the Pre-BSR; and
starting a retransmission timer in response to transmission of the Pre-BSR.

10. The method of claim 9, further comprising:
retransmitting the Pre-BSR in response to an expiry of the retransmission timer if uplink data is expected to be received at the communication device.

11. The method of claim 1, further comprising:
maintaining the triggered Pre-SR if uplink resource large enough to accommodate all pending data for transmission at the communication device but not enough to accommodate the Pre-BSR is granted.

12. The method of claim 11, wherein the uplink resource is not large enough to accommodate the buffer statuses up to the last event that triggered a Pre-BSR.

13. The method of claim 1, further comprising:
cancelling the triggered Pre-SR if uplink resource large enough to accommodate the Pre-BSR is granted.

14. The method of claim 13, wherein the uplink resource is large enough to accommodate the buffer statuses up to the last event that triggered a Pre-BSR.

15. The method of claim 1, wherein the Pre-SR is associated:
with an egress logical channel (LCH) corresponding to an ingress LCH having the highest priority among at least one ingress LCH associated with the first BSR;
with an egress LCH corresponding to an ingress LCH having the highest priority among at least one ingress LCH associated with the first BSR and one or more other BSRs received at the communication device;
with an egress LCH corresponding to an ingress LCH associated with a scheduling request (SR) received at the communication device;
with an egress LCH having the highest priority among at least one egress LCH, and wherein the at least one egress LCH is associated with at least one logical channel group (LCG) indicated in the Pre-BSR;
or some combination thereof.

16. The method of claim 1, further comprising:
if the Pre-SR is to be transmitted at a transmission occasion the same as that for a first SR pending at the communication device, transmitting the first SR at the transmission occasion.

17. The method of claim 1, further comprising:
if the Pre-SR is to be transmitted at a transmission occasion the same as that for a first SR pending at the communication device, transmitting one of the Pre-SR and the first SR which is associated with a logical channel (LCH) having the highest priority among the LCHs associated with the Pre-SR and the first SR;
if the Pre-SR is to be transmitted at a transmission occasion the same as that for a physical uplink shared channel (PUSCH) without an uplink shared channel (UL-SCH), transmitting the PUSCH at the transmission occasion;
or a combination thereof.

18. A communication device, comprising:
at least one memory; and
at least one processor coupled with the at least one memory and configured to cause the communication device to:
receive a first buffer status report (BSR); and
trigger a preemptive buffer status report (Pre-BSR) based on the first BSR in response to a trigger condition being met;
determine that no uplink resource is available for transmitting the pre-BSR; and
based on the determining, trigger a preemptive scheduling request (Pre-SR) in response to there being no uplink resource available for transmitting the Pre-BSR.

* * * * *